United States Patent

Gomez et al.

[19]

[11] Patent Number: 5,833,371
[45] Date of Patent: Nov. 10, 1998

[54] DEVICE FOR TRANSMITTING A TEMPERATURE SIGNAL BY MECHANICAL MEANS

[75] Inventors: Jose Luis Lopez Gomez; Luis Archilla Aldeanueva, both of Madrid, Spain

[73] Assignee: Investigacion Y Asesoramiento Tecnico, S.A. Invastesa, Madrid, Spain

[21] Appl. No.: 569,302

[22] Filed: Dec. 8, 1995

[30] Foreign Application Priority Data

Dec. 16, 1994 [ES] Spain .................................. P9402569

[51] Int. Cl.⁶ .................................................... F16C 19/52
[52] U.S. Cl. ........................... 384/448; 384/557; 384/597
[58] Field of Search .................................. 384/448, 557, 384/493, 597, 595, 596

[56] References Cited

U.S. PATENT DOCUMENTS

| Re. 34,129 | 11/1992 | Wright | 384/423 |
| 2,897,775 | 8/1959 | Thesen | 116/102 |
| 4,859,089 | 8/1989 | Wright | 384/423 |
| 5,046,865 | 9/1991 | Gatnarek | 384/423 |
| 5,271,678 | 12/1993 | Bourgeot | 384/221 |

FOREIGN PATENT DOCUMENTS 64941 10/1892 Germany.

*Primary Examiner*—Lenard A. Footland
*Attorney, Agent, or Firm*—Ladas & Parry

[57] ABSTRACT

Device for transmitting a temperature signal by mechanical means, which consists in the use of a thermostatic element (1) made from expandable material which, when the inner bearing heats up, pushes against a rod (2) secured to a disc-carrying piece (3) and, simultaneously, to a disc (4), which, if the temperature is sufficiently high, is displaced until it comes into contact with the outer cover (5) of the bearing mounted on the other side of the wheel, that is to say on the outside, and the higher the temperature reached by the inner bearing, the greater will be the pressure exerted by the disc (4) on the cover (5) and the more rapidly the threshold detection temperature will rise, which temperature will be picked up by the pick-up device located on the track. (FIG. 1)

9 Claims, 2 Drawing Sheets

Z

DEVICE FOR TRANSMITTING A TEMPERATURE SIGNAL BY MECHANICAL MEANS

SUBJECT OF THE INVENTION

The present invention relates to a device for transmitting a temperature signal by mechanical means, the aim of which is to pick up overheating in running gear, so that, in turn, this overheating is recorded by track detectors, and to remedy the anomaly.

FIELD OF THE INVENTION

This invention applies within the railway industry.

BACKGROUND OF THE INVENTION

As is known, when running gear equipped with outer and inner bearings is used, with the aim of having either undercarriage systems or bogies with independent wheels or, alternatively, undercarriage systems or bogies with the capability of travelling along two different track widths available, it is impossible totally and absolutely to prevent a possible incident occurring owing to overheating of an inner bearing without exhaustive monitoring, by means of some specific procedure, of the temperature of the bearing proper, since the detectors located on the track to fulfil this specific function as the vehicles pass are located on the outside of the body of the track in order to pick up possible heating-up which may occur in the bearings of conventional-type axles which are mounted on journals outside the wheels.

Consequently, in order to monitor the temperature of the inner bearings, use must be made of some element, device, system or mechanism which is incorporated in the actual vehicle.

For example, use may be made of temperature sensors, such as thermocouples, thermal resistors, thermistors, etc., placed on the stationary part of the bearing, which, suitably set-up, are able to detect overheating or, alternatively, leave a record that this heating-up has occurred by means of some optical or acoustic signal and, also, cause the train to stop by directly acting on the actuation of the emergency brake.

The said device or system for monitoring temperature, which could also be applied to bearings mounted externally, has the practically insolvable drawback that it requires electrical energy in order to operate.

This requirement cannot be remedied totally and absolutely in the case of vehicles intended for transporting goods since this type of vehicle does not have any source of electrical energy.

The possibility is envisaged of solving the problem in question by entrusting pick-up of the overheating to the track detectors, but, for this purpose, use must be made of a system or device for transmitting a temperature signal by exclusively mechanical means.

From ES-A-2 024 062 a system is known that is intended to detect and transmit overheating from an inner bearing to an outer bearing by means of a sensor located in the inner bearing, which on being heated gives rise to the electric heating of an infrared indicator mounted in the housing of the outer bearing.

Also, from EP-A-0 288 155 a device is known that is intended to be installed adjacent to a bearing of a train wheel and having a receptacle containing a wax which on being heated expands causing a piston to move and so to eject a projection which acts as an antenna that communicates the overheating of the bearing.

However, hitherto, there was no knowledge of the existence of a device able to transmit a temperature signal by exclusively mechanical means to the track detectors, with the purpose of passing on information about the existence of overheating in bearings mounted on the inside.

DESCRIPTION OF THE INVENTION

The device for transmitting a temperature signal by mechanical means, proposed by the invention, represents by itself a solution to the problem which currently exists in this field, since, on the basis thereof, it is possible to have a mechanism or device available which is able to produce non-stop information about the temperature existing in the bearings mounted on the inside, which information is sent to the track detectors in the event of overheating.

More specifically, the device for transmitting a temperature signal by mechanical means consists of accommodating, inside a hollow axle provided with two bearings, an outer bearing and another, inner, bearing, the device which is the subject of the invention relating to the transmission of a temperature signal by mechanical means, that is to say to the detection of the temperature of the inner bearing and of the transmission to the outer bearing of a mechanical signal which is proportional to the temperature.

When the inner bearing heats up, the thermostatic element made from expandable material pushes a rod which is secured to the piece carrying the disc and to the disc proper, which, if the temperature is reasonably high, will be displaced until it comes into contact with the outer cover of the bearing mounted on the other side of the wheel, that is to say on the outside.

The disc will rotate together with the axle and, upon making contact with the cover, will be in friction therewith, heating the cover up so that it acquires a temperature which is similar to or greater than the threshold detection temperature of the pick-up system located on the actual track.

The higher the temperature reached by the inner bearing, the greater will be the pressure exerted by the disc on the cover and, consequently, the more rapidly the temperature will increase.

In fact, if the elastic characteristic of the spring is modified, it is possible to vary the pressure exerted by the disc on the cover, the disc and the rest of the mechanism being successfully returned to their original position when heating-up of the inner bearing ceases, and by modifying the type of friction material in rubbing contact with the cover of the outer bearing it is also possible to vary the temperature of this cover and its evolution.

DESCRIPTION OF THE DRAWINGS

In order to supplement the description being given and with the aim of assisting better comprehension of the characteristics of the invention, the present specification is accompanied, as an integral part thereof, by two sheets of drawings in which, in an illustrative and non-limiting manner, the following have been shown.

PREFERRED EMBODIMENT OF THE INVENTION

Figure 1:
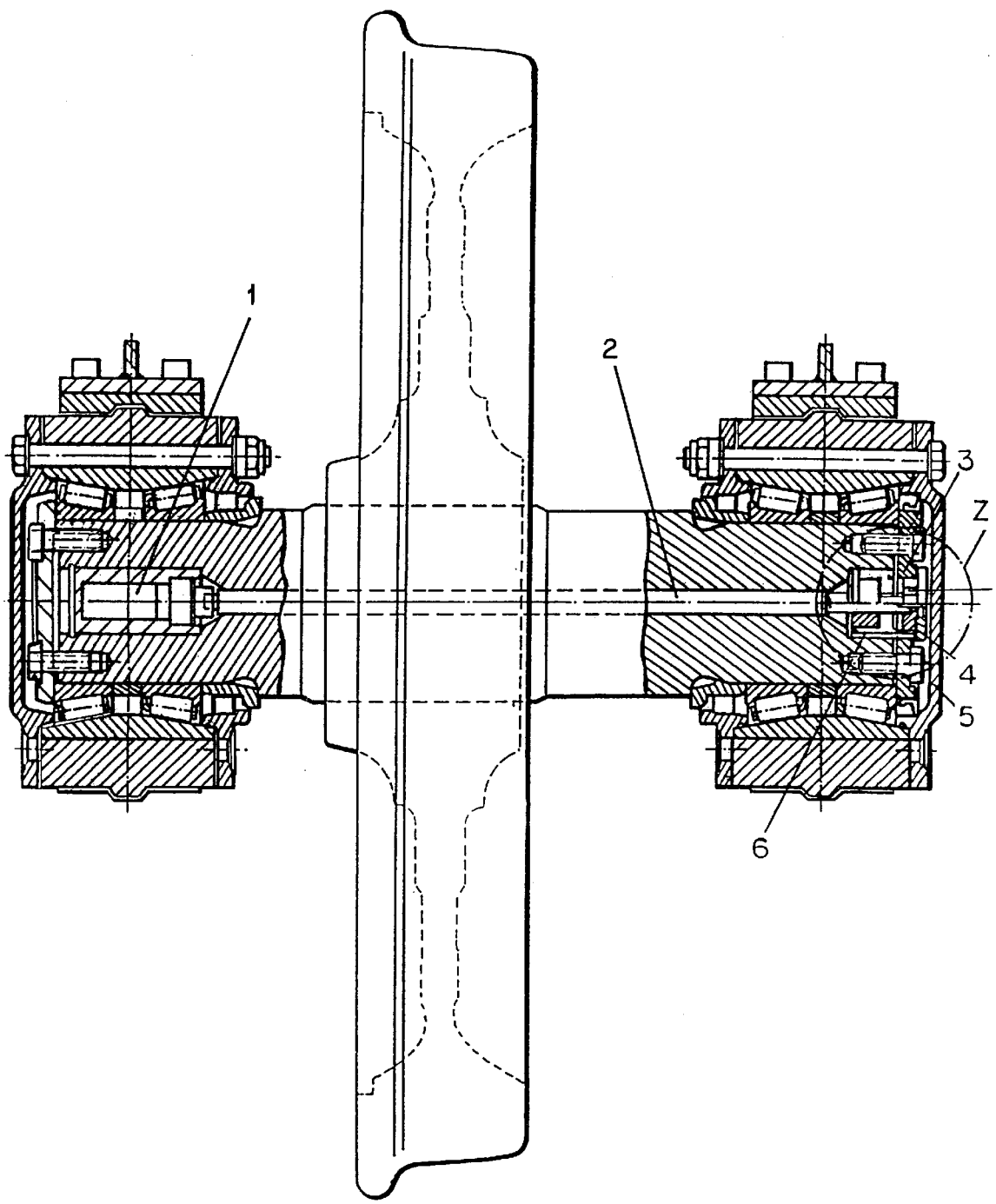
FIG. 1 shows an independent wheel, wedged on its axle, which axle is provided with two bearings, an outer bearing and another, inner, bearing, the system for detecting the temperature of the inner bearing being accommodated inside the hollow axle.

As may be seen in FIG. 1, an independent wheel is wedged on its axle, which axle is provided with two bearings, one of these bearings being located in the external zone and another being located in the internal zone.

The device for detecting the temperature of the inner bearing and for transmitting a mechanical signal which is proportional to the temperature to the outer bearing is accommodated inside the axle in question, which is hollow.

That is to say that the subject of the invention is located inside the actual axle and acts in accordance with the heating-up of the inner bearing which causes the thermostatic element (1) made from expandable material to push the rod (2) which is secured to the disc-carrying piece (3) and to the disc (4) which, if the temperature is sufficiently high, will be displaced until it comes into contact with the outer cover (5) of the bearing mounted on the other side of the wheel, that is to say mounted on the outside.

Figure 2:
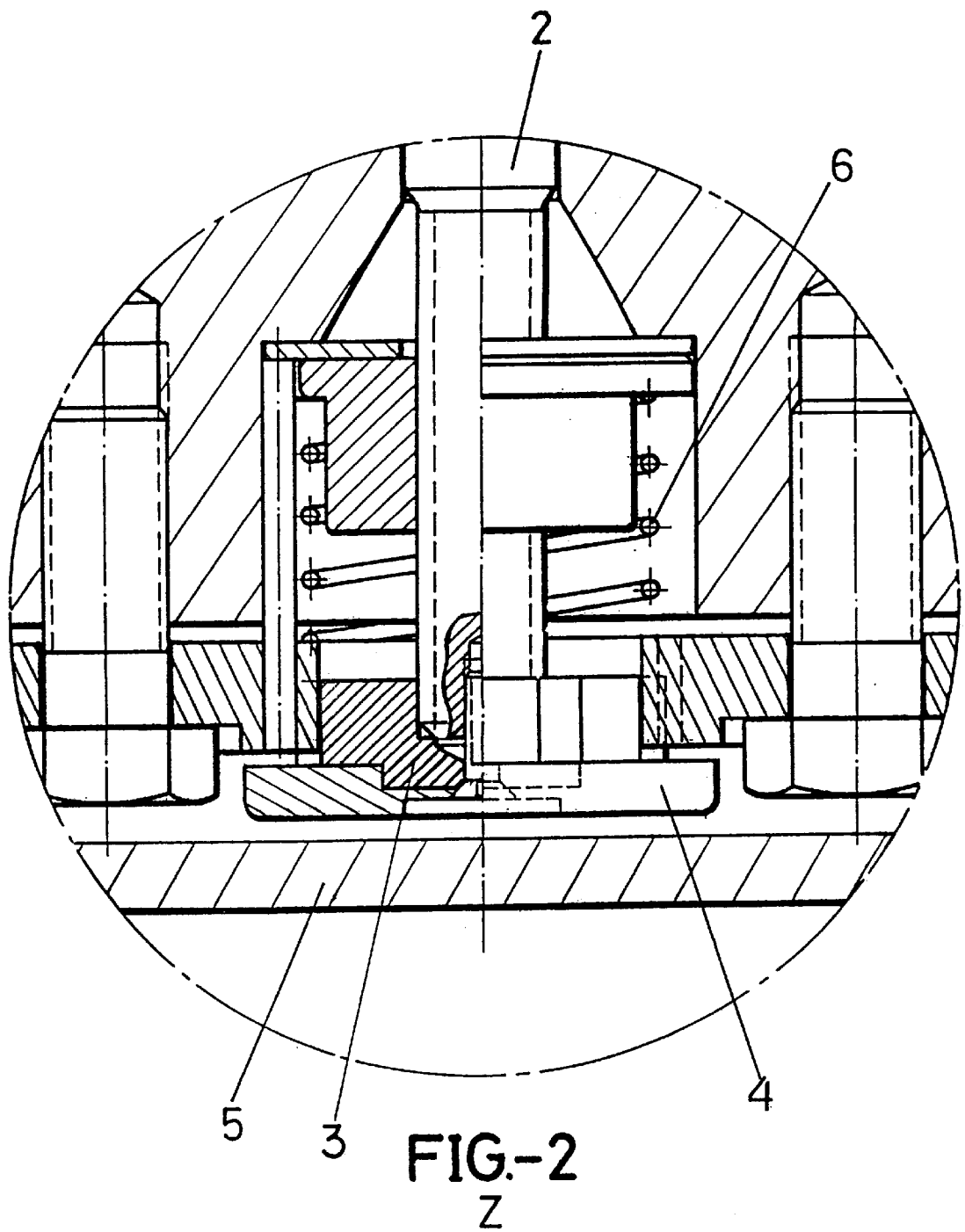
FIG. 2 corresponds to the disc incorporated in the invention which relates to a device for transmitting a temperature signal by mechanical means.

This assembly may be seen as described previously in FIG. 1, whilst the detail "Z", which corresponds to the disc (4), has been represented fully in FIG. 2.

When this disc (4) which rotates together with the axle comes into contact with the cover (5) it is in friction therewith, heating it up in such a manner that this cover (5) acquires a temperature which is similar to or greater than the threshold detection temperature of the pick-up device located on the track.

The higher the temperature reached by the inner bearing, the greater will be the pressure exerted by the disc (4) on the cover (5) and, consequently, the more rapidly the temperature will increase. This temperature and the manner in which it evolves may also be varied by varying the material of the friction disc (4).

If the elastic characteristic of the spring (6) is modified, it is possible to vary the pressure exerted by the disc (4) on the cover (5) and, consequently, the disc (4) and the rest of the mechanism will be returned successfully to their original position when heating-up of the inner bearing ceases.

It is not regarded as necessary to expand this description for any expert in the field to be able to understand the scope of the invention and the advantages derived therefrom.

The materials, form, size and arrangement of the elements may be varied provided this does not give rise to a modification of the essential nature of the invention.

The terms in which this specification has been described must always be taken in their widest and non-limiting sense.

We claim:

1. Device for transmitting a temperature signal by mechanical means, intended for use on railways for detecting heating-up of the inner bearing and for transmitting a mechanical signal which is proportional to the temperature to the outer bearing, characterized in that, when the inner bearing heats up, a thermostatic element (1) made from expandable material pushes a rod (2) secured to a disc-carrying piece (3) and, in turn, to a disc (4) which, if the temperature is sufficiently high, is displaced until it comes into contact with the outer cover (5) of the bearing mounted outside said wheel, and when the disc (4) which rotates together with the axle comes into contact with the cover (5) it is in friction therewith, heating it up in such a manner that it acquires a temperature which is similar to or greater than the threshold detection temperature of the pick-up device located on the track.

2. Device for transmitting a temperature signal by mechanical means according to claim 1, characterized in that the higher the temperature reached by the inner bearing, the greater will also be the pressure exerted by the disc (4) on the cover (5) and, consequently, the more rapidly the temperature of the cover (5) will increase.

3. Device for transmitting a temperature signal by mechanical means according to claim 1, characterized in that, by modifying the elastic characteristic of a spring (6) the amount of the pressure exerted by the disc (4) on the cover (5) may be varied, the disc (4) and the rest of the mechanism being returned successfully to their original position when heating-up of the inner bearing ceases.

4. A device for mechanically transmitting a temperature signal in a wheel that is intended for use in railway systems, said wheel being mounted for rotatable movement on an axle that is provided with inner and outer bearings mounted on respective inner and outer sides of said wheel, said device comprising:

an outer cover (5) mounted outside said wheel for housing said outer bearing;

a thermostatic element (1) made from expandable material for detecting temperature of said inner bearing and adapted to expand in accordance with increasing temperature of said inner bearing;

a rod (2) having a first end adapted for contacting said thermostatic element (1) and being secured at a second end to a disc-carrying piece (3) including a disc (4) that is rotatable with said axle, said rod (2) and disc (4) being displaced in an axial direction in accordance with increasing temperature of said inner bearing such that, when said inner bearing temperature is sufficiently high, said disc (4) is displaced to an extent so that it exerts pressure on said outer cover to thereby heat said outer cover by friction.

5. The device for mechanically transmitting a temperature signal according to claim 4, wherein said axle is hollow and said device is located inside said axle.

6. The device for mechanically transmitting a temperature signal according to claim 4, wherein said railway system includes a track upon which said wheel travels and a temperature pick-up detector located on said track, said disc (4) being adapted for displacement to an extent such that said outer bearing acquires a temperature which is substantially equal to or greater than a threshold detection temperature of said pick-up device.

7. The device for mechanically transmitting a temperature signal according to claim 4, wherein said disc (4) exerts pressure on said cover (5) in accordance with the temperature of said inner bearing such that, the greater the temperature of said inner bearing, the more rapidly the temperature of the cover (5) will increase.

8. The device for mechanically transmitting a temperature signal according to claim 4, further including a spring means (6) positioned between said rod (2) and said disc-carrying piece (3) for varying the amount of pressure exerted by the disc (4) on said cover (5) in accordance with elastic characteristic of said spring (6).

9. The device for mechanically transmitting a temperature signal according to claim 8, wherein said spring (6) enables said device to return to its original position when heating-up of the inner bearing ceases.

* * * * *